UNITED STATES PATENT OFFICE.

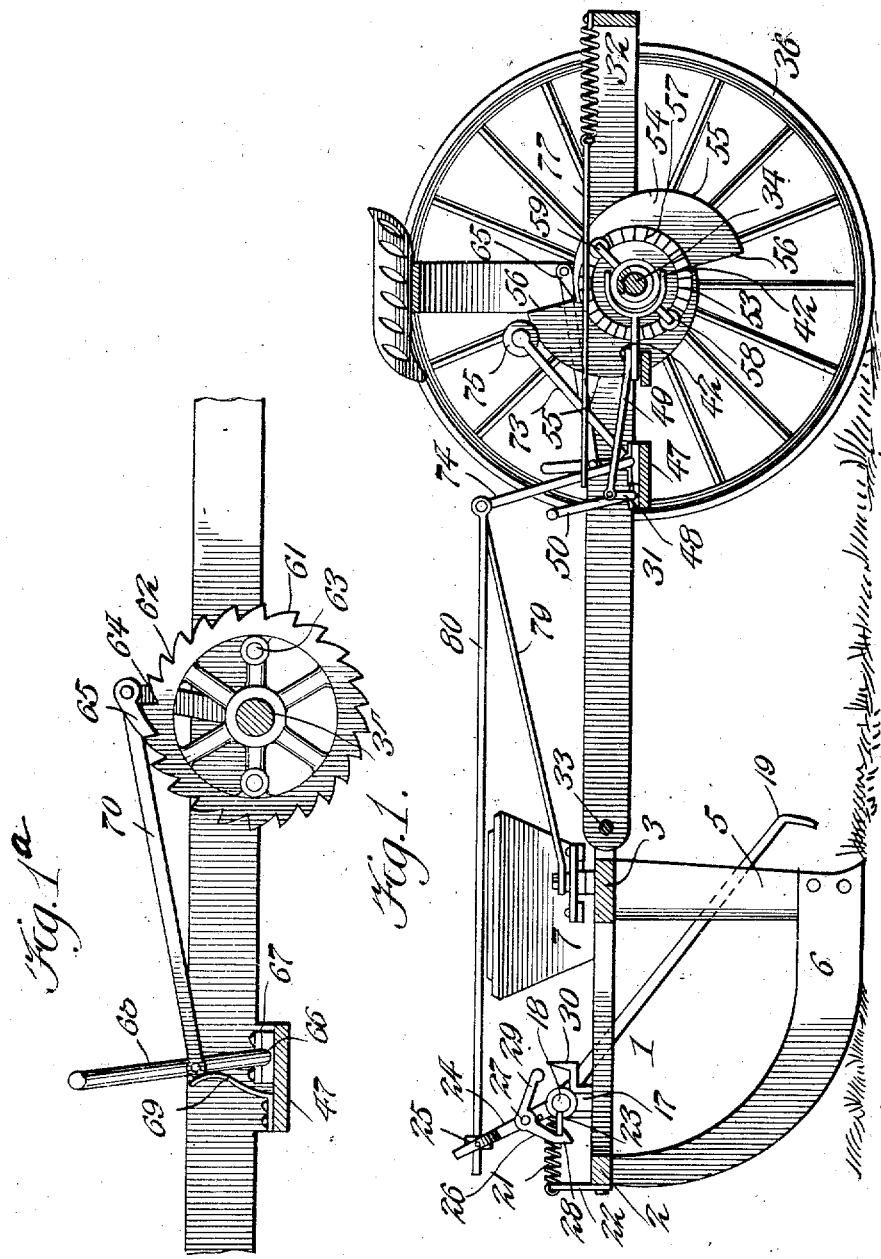

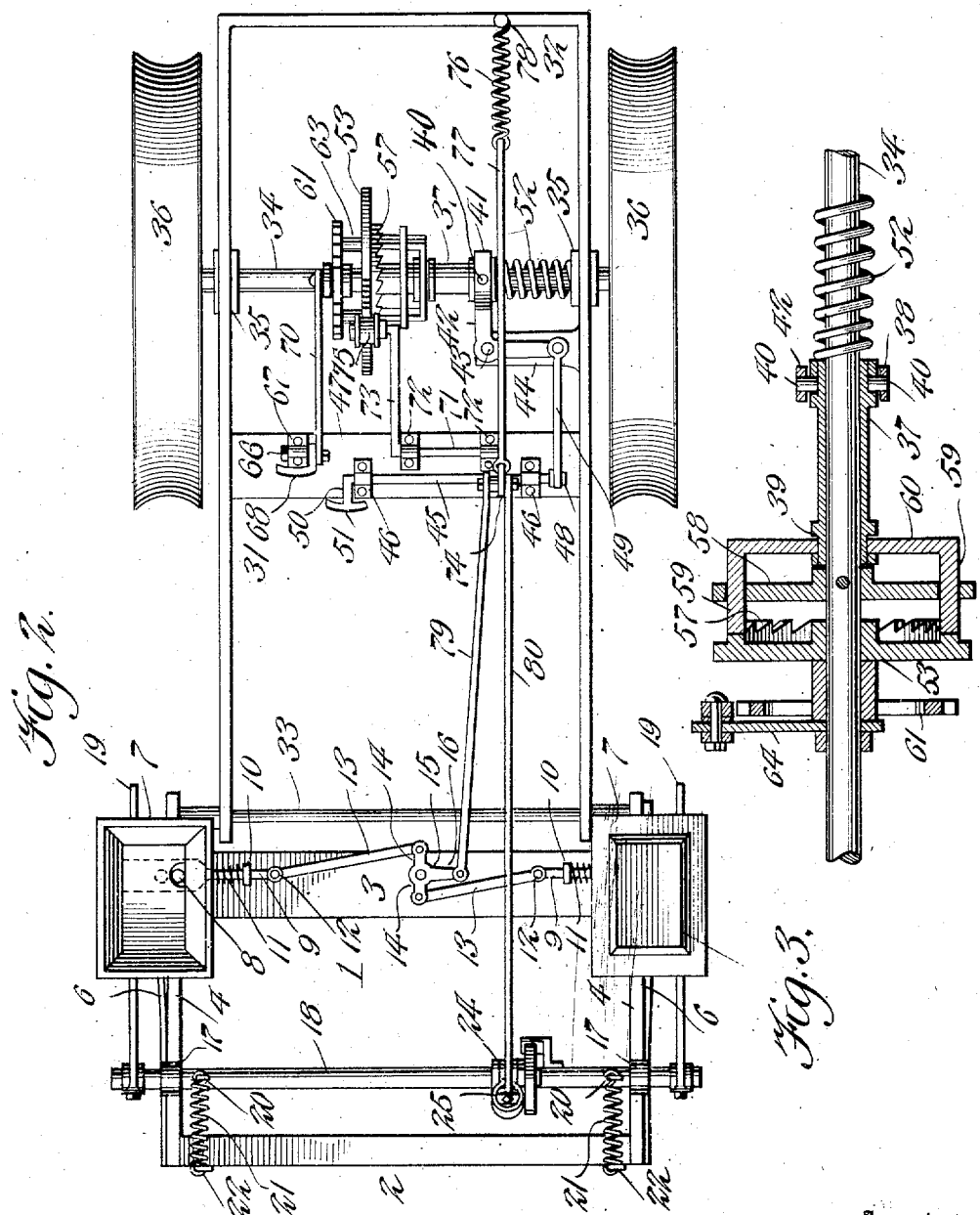

WILLIAM S. HASLEU, OF KIESTER, MINNESOTA.

CORN-PLANTER.

No. 884,153.

Specification of Letters Patent.

Patented April 7, 1908.

Application filed August 2, 1907. Serial No. 386,779.

*To all whom it may concern:*

Be it known that I, WILLIAM S. HASLEU, a citizen of the United States, residing at Kiester, in the county of Faribault and State of Minnesota, have invented new and useful Improvements in Corn-Planters, of which the following is a specification.

This invention is an improved check row corn planter adapted for operation without the use of a check wire or line, such as is commonly employed, and the said invention consists in the construction, combination and arrangement of devices hereinafter described and claimed.

One object of my invention is to provide improved means for marking the hills as the same are planted.

A further object is to provide improved means for operating the corn-dropping devices.

A further object is to provide improved means for preliminarily setting or adjusting the corn-dropping operating means.

In the accompanying drawings,—Figure 1 is a longitudinal sectional view of a check row corn planter constructed in accordance with my invention. Fig. 1ª is a detail sectional view of means for setting the cam which actuates the seed dropping and marking mechanism. Fig. 2 is a top plan view of the same. Fig. 3 is a detail sectional view.

I will first describe the front truck or runner frame 1 of my improved check row corn planter. The same has an upper frame which comprises a front cross bar 2, a rear cross bar 3, and side bars 4 which connect them together. From the ends of the rear cross bar 3 depend seed spouts 5. Furrow opening runners 6 have their rear ends attached to the lower ends of such spouts and their upper, front ends attached to the ends of the cross bar 2. A pair of seed hoppers 7 are secured on the ends of the rear cross bar 3, and in the bottoms of the said hoppers operate seed dropping elements 8 which may be of any suitable well known construction and specifically constitute no portion of my present improvements. Rods 9 extend inwardly from the said seed-dropping elements and pass through guides 10 on the rear cross bar 3. On the said rods springs 11 are provided which serve to normally close the said seed-dropping elements by moving said rods endwise in one direction. The said rods 9 are connected by pivots 12 to the outer ends of links 13, the inner ends of which are pivotally connected to oppositely extending arms 14 of a bell crank 15 which also has an arm 16. It will be understood that by imparting oscillating motion to the said bell crank, the said dropping elements through the instrumentality of the connections hereinbefore described may be operated to cause the same to drop seeds from the hopper through the said spouts into the furrows made by the runners 6. On the said bars 4 are bearings 17 for a rock shaft 18 which carries at its ends a pair of marking hoes 19 which when depressed serve to mark the earth at points opposite and in line with the hills in which the seeds have been dropped.

The rock shaft is provided with upwardly extending arms 20 to which are attached springs 21, here shown as coiled springs having their front ends attached to arms 22 which rise from the front cross bar 2. Said springs serve to normally retain the marking hoes in the elevated position shown in Fig. 1. Said rock shaft is further provided with a projection 23. On the said rock shaft is mounted an oscillating arm 24 having a fork at its upper end in which a collar 25 is pivotally mounted. The said oscillating arm carries a trigger 26 which is pivoted thereto, as at 27, has an arm 28 provided with a shoulder to engage the projection 23, and also has a rearwardly extending arm 29. A stop 30, which is immovably secured on a suitable support, is disposed in rear of the rock shaft 18 in such position as to be engaged by the arm 29 of the trigger when the oscillating arm 24 is at the rearward limit of its stroke, to disengage said trigger from the projection 23 and hence permit the springs 21 by partly revolving the rock shaft to return the marking hoes to their initial elevated position shown in Fig. 1, it being understood that the rearward movement of the oscillating arm 24, by the engagement of its trigger with the projection 23 of the rock shaft, turns the latter to the position required to cause the marking hoes to be moved downwardly so as to mark the corn hills.

The rear truck or wheel frame 31 comprises a frame 32, the front end of side bars are pivotally connected to the rear end of the front truck frame for movement in a vertical plane, as at 33. A driving shaft or axle 34 is journaled in bearings 35 with which said frame 32 is provided, and on the ends of the said driving shaft are traction and covering wheels 36, one of which is loose on such shaft, the other serving to cause such shaft to be revolved when the machine is in motion. On the said shaft is a longitudinally movable sleeve 37 which is provided with annular circumferential grooves 38, 39 at its ends. Said groove 38 is engaged by studs 40 of a fork 41 with which a bell crank 42 is provided, said bell crank being pivotally mounted, as at 43, on an arm 44 which extends inwardly from one side of the frame 32. A rock shaft 45 is journaled in bearings 46 on a cross bar 47 of the frame 32 and is provided at one end with a crank arm 48 to which is attached a link 49, the rear end of said link being pivotally connected to the bell crank 42. At the opposite end of said rock shaft is an arm 50 having a foot piece 51 which may be operated by the driver to cause the rock shaft 45 to turn in one direction and hence cause the bell crank 42 connected to such rock shaft to move the sleeve 37 in one direction on the shaft 34 against the tension of a spring 52, which is here shown as a coiled spring and disposed on the shaft 34 and bearing between the outer end of said sleeve and one of the bearings 35.

A cam 53 is loosely mounted on the shaft 34 and is provided with oppositely extending arms 54, each presenting an eccentric cam surface 55 and a shoulder 56. The said cam is provided on one side with a concentrically disposed series of ratchet teeth 57. A cross bar 58 is secured on the shaft 34 for revolution, and its arms are provided with openings which form guides for parallel arms 59 of a yoke 60, which yoke engages the groove 39 of the sleeve 37 and thereby effects a swivel connection with such sleeve. The outer ends of the arms 59 are shaped to engage the ratchet teeth 57 which form a ratchet gear on one side of the cam 53 to lock the said yoke to the said cam, and since the said yoke is locked to the shaft 34 by the engagement of its arms with the cross bar 58, thereby also locking the said cam to the said shaft, said yoke with its sleeve and the cross bar 58 coacting with the ratchet gear 57 to form a clutch for locking the cam 53 to the shaft 34 and releasing the same therefrom, the spring 52, which moves the sleeve 37 in one direction, serving to normally keep the said cam locked or clutched to the said shaft.

A set gear 61, which is provided with peripheral ratchet teeth 62, is loose on the shaft 34 and is secured to the cam 53 for rotation therewith, as at 63. A rock arm 64 is mounted for oscillation on the shaft 34 and is provided with a gravity-acting dog or pawl 65 for engagement with the upper side of the set gear. A rock shaft 66 is mounted in a bearing 67 on the cross bar 47 and has a foot lever 68, whereby it may be turned in one direction, a spring 69 being provided to turn such lever in the reverse direction. A link 70 connects the said lever 68 to the rock arm 64 and hence enables the latter to be operated by the foot lever 68 to cause the said wheel 61 to be turned by a step-by-step motion and hence cause the cam 53 to be revolved with such set wheel to initially dispose the cam wheel in the required position.

A rock shaft 71 is mounted in bearings 72 on the cross bar 47 and is provided at its ends with rock arms 73, 74, the former provided with a tappet roller 75 which engages the cam 53. A spring 76 is connected, as by means of a rod 77, to the rock arm 74 of the rock shaft 71 and is also connected, as at 78, to the arm 32 and serves to normally draw rearwardly on the rock arm 74 and hence normally move the rear end of the rock arm 73 downwardly. The said rock arm 74 is connected to the arm 16 of the bell crank 15 as by means of a rod 79 and is also connected to the collar 25 by a rod 80, whereby motion may be imparted from the rock shaft 71, which is oscillated by the cam 53, to the said dropping mechanism and to the rock shaft 18 which serves to actuate the marking hoes.

In order to throw the seed-dropping mechanism and the marking mechanism out of operation it is only necessary to unclutch the cam 53 from the shaft 34, which may be done by actuating the foot lever 51 to cause such lever, through the instrumentality of the connecting devices hereinbefore described, to move the yoke 60 which constitutes a clutch element out of engagement with the gear 57, which constitutes the other clutch element. To initially set such cam before starting the machine at the beginning of a row, it is only necessary for the driver by means of the foot lever 68 and the connections hereinbefore described to partially turn such cam so that the same will cause the seed-dropping mechanism to be so actuated as to deposit the seed in line with those of the previously planted hills.

Having thus described the invention, what is claimed as new, is:—

1. In a check row planter, the combination of a rocking marker shaft having a projection, a spring to normally support the markers in an elevated position, a rock arm, means to actuate the same, a trigger having a shoulder to engage the projection of the marker and move the latter and such rock arm in one direction against the tension of the spring, and means to trip such trigger and release the same from the said projection to cause the spring to impart a marking stroke to the marker.

2. In a check row planter having a front truck or runner frame and a rear truck or wheel frame flexibly connected to such front truck, a seed dropping mechanism on such front truck, a rocking marker shaft also on such front truck having a projection, springs to normally support the markers in an elevated position, a rock arm, means to actuate the same, a trigger having a shoulder to engage the projection of the marker shaft and move the latter and such rock arm in one direction against the tension of the springs, means to trip such trigger and release the same from the said projection to cause the springs to impart a marking stroke to the markers, an operating lever on the rear truck to which such seed dropping mechanism and such rock arm are connected, and means carried by such rear truck to operate such operating lever.

3. In a check row planter having a front truck or runner frame and a rear truck or wheel frame flexibly connected to such front truck, a seed dropping mechanism on such front truck, a rocking marker shaft also on such front truck having a projection, springs to normally support the markers in an elevated position, a rock arm, means to actuate the same, a trigger having a shoulder to engage the projection of the marker shaft and move the latter and such rock arm in one direction against the tension of the springs, means to trip such trigger and release the same from the said projection to cause the springs to impart a marking stroke to the markers, an operating lever on the rear truck to which such seed dropping mechanism and such rock arm are connected, a driving shaft for the rear truck, a cam loose thereon and engaged by such operating lever to actuate the planting and marking mechanisms, said cam having a ratchet gear, a spring coacting with said cam to operate said operating lever, a clutch for said cam to lock the same to said shaft, an arm loose on said shaft and having a spring pressed pawl engaging the ratchet gear and a lever connected to said arm to operate the same for setting the cam.

In testimony whereof I affix my signature in presence of two witnesses.

WILLIAM S. HASLEU.

Witnesses:
C. W. TEUBNER,
JAMES M. FREDERICK.